(12) United States Patent
Fujita

(10) Patent No.: US 6,823,137 B2
(45) Date of Patent: Nov. 23, 2004

(54) OPTICAL LINE PROTECTION DEVICE AND OPTICAL LINE PROTECTION METHOD

(75) Inventor: Yoshitaka Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 560 days.

(21) Appl. No.: 09/730,563

(22) Filed: Dec. 7, 2000

(65) Prior Publication Data

US 2001/0003484 A1 Jun. 14, 2001

(30) Foreign Application Priority Data

Dec. 9, 1999 (JP) .......................................... 11-350400

(51) Int. Cl.$^7$ ................................................ G02F 1/00
(52) U.S. Cl. ...................... 398/2; 398/5; 398/8; 398/54
(58) Field of Search ............................... 398/1–2, 5, 8, 398/51, 54; 370/218, 907

(56) References Cited

U.S. PATENT DOCUMENTS 5,717,796 A * 2/1998 Clendening ................... 385/24
5,889,610 A * 3/1999 Fatehi et al. ............ 359/341.43
6,163,527 A * 12/2000 Ester et al. .................. 370/228
6,614,753 B2 * 9/2003 Ikawa .......................... 370/222

FOREIGN PATENT DOCUMENTS

JP 9-247197 9/1997

* cited by examiner

*Primary Examiner*—Kinfe-Michael Negash
(74) *Attorney, Agent, or Firm*—Sughrue Mion, PLLC

(57) ABSTRACT

To provide a system in which a configuration is simple and a switching of an optical line can be performed at a high speed. A protection unit for performing optical line protection by using K1–K2 information inserted into a payload is provided for each physical interface. The protection unit includes a filter for separating a payload of user data and a payload including K1–K2 information according to a control signal in a received payload, a selector for switching user data to be transmitted or K1–K2 information to be transmitted after adding a control signal of a value corresponding thereto, and a control unit for controlling an output buffer to a switch block and creating K1–K2 information to be transmitted and communicating with a physical interface card of another system on the basis of K1–K2 information.

9 Claims, 10 Drawing Sheets

FIG. 3

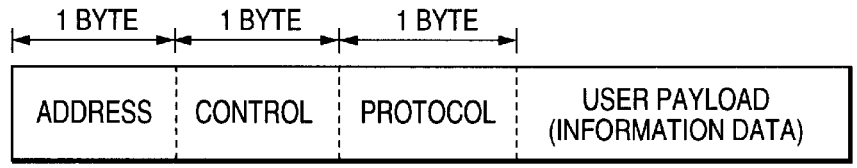

FORMAT OF SIGNALS (S2015,S2016) TO BE INPUTTED
AND OUTPUTTED TO AND FROM BLOCK 2014

FIG. 4

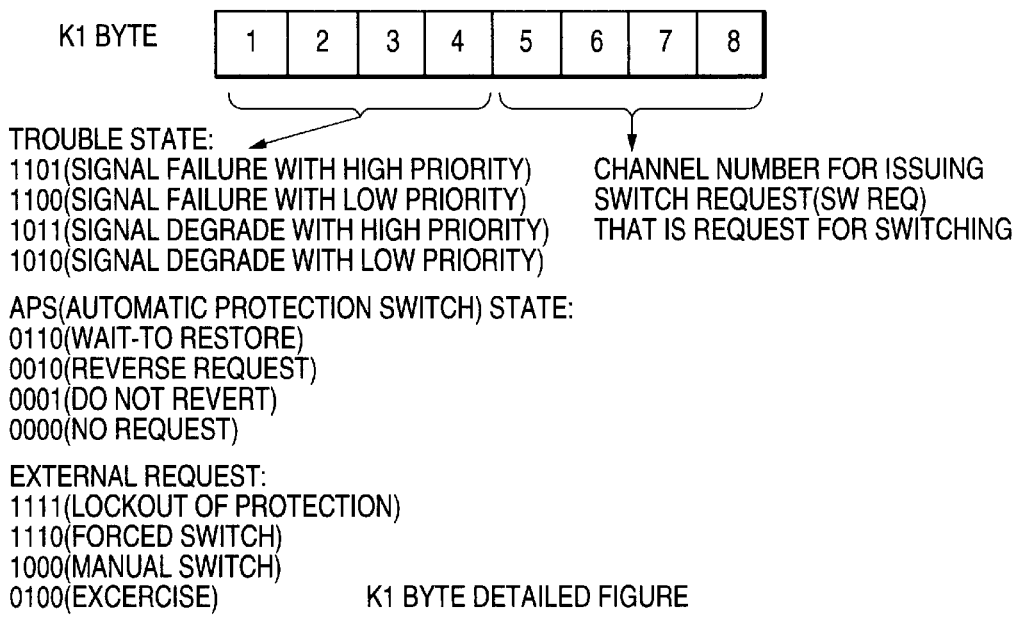

K1 BYTE

TROUBLE STATE:
1101(SIGNAL FAILURE WITH HIGH PRIORITY)
1100(SIGNAL FAILURE WITH LOW PRIORITY)
1011(SIGNAL DEGRADE WITH HIGH PRIORITY)
1010(SIGNAL DEGRADE WITH LOW PRIORITY)

CHANNEL NUMBER FOR ISSUING
SWITCH REQUEST(SW REQ)
THAT IS REQUEST FOR SWITCHING

APS(AUTOMATIC PROTECTION SWITCH) STATE:
0110(WAIT-TO RESTORE)
0010(REVERSE REQUEST)
0001(DO NOT REVERT)
0000(NO REQUEST)

EXTERNAL REQUEST:
1111(LOCKOUT OF PROTECTION)
1110(FORCED SWITCH)
1000(MANUAL SWITCH)
0100(EXCERCISE)             K1 BYTE DETAILED FIGURE

FIG. 5

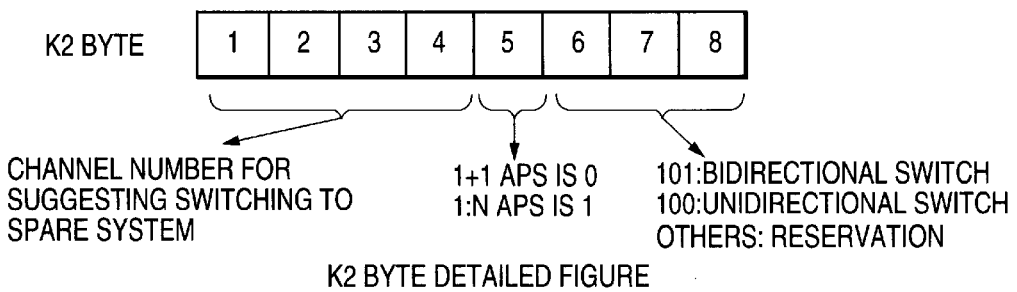

K2 BYTE

CHANNEL NUMBER FOR
SUGGESTING SWITCHING TO
SPARE SYSTEM

1+1 APS IS 0
1:N APS IS 1

101:BIDIRECTIONAL SWITCH
100:UNIDIRECTIONAL SWITCH
OTHERS: RESERVATION

K2 BYTE DETAILED FIGURE

FRAME CONFIGURATION OF SDH/SONET

TOTAL CONFIGURATION OF DEVICE AND SYSTEM FOR PERFORMING LINE PROTECTION BY CONVENTIONAL METHOD

OPTICAL LINE PROTECTION DEVICE AND OPTICAL LINE PROTECTION METHOD

BACKGROUND OF THE INVENTION

1. Field of the Invention

The present invention relates to a system of optical line protection, and partially, relates to a device and a method of optical line protection in SDH/SONET (synchronous digital hierarchy/synchronous optical network).

2. Description of the Prior Art

In a system of optical line protection of SDH/SONET, previously, particularly as shown in FIG. 15, a management and control card 601 has mainly and intensively performed a control of each physical interface card and a processing of K1–K2 control information.

The K1–K2 control information is embedded in an overhead of an SDH/SONET signal in advance, and by extracting and inserting that information, the control of switching of the optical lines from the current system to the spare system is performed. In FIG. 15, the circuit for terminating the physical layer on a current system physical interface card 201W of the own station side device extracts the K1–K2 control information from the overhead, and transfers it through S501 to the management and control card 601. On the contrary, from the management and control card 601, the K1–K2 control information is inserted into the circuit for terminating the frame of SDH/SONET and the overhead on the current system physical interface card 201W through S502. The transfer of the K1–K2 control information on the spare system physical interface card 201P is also similar, and the exchange of information is performed by using signal lines S503, S504. On the optical line signal reception side, the frame of SDH/SONET and the overhead information are terminated in all physical interface cards in the device, and only the K1–K2 control information is taken out through a separately arranged signal line, and is sent to the management and control card (601), and similarly, on the signal transmission side, only the K1–K2 control information is sent from the management and control card (601) through a separately arranged signal line to the physical interface card, and is put on the overhead on the frame of SDH/SONET. That is, the management and control card (601) performs termination processing of the K1–K2 control information from all physical panels, and further, by performing the tri-state control (for example, control by S505, S506, S2505, S2506) of the gate for passing a signal (301) going toward a switch block (401), it controls the switching from the current system to the spare system or from the spare system to the current system of a signal from each physical interface card.

BRIEF SUMMARY OF THE INVENTION

OBJECT OF THE INVENTION

Here, in the case where a plurality of optical line ports exist on the physical interface card, or in the case where the device has a configuration of a plurality of physical interface cards in which a plurality of optical line ports are packaged, it is necessary to provide a signal line for the K1–K2 control information processing separately for each optical line port. Furthermore, it is also necessary to similarly separately provide a signal line for the tri-state control for opening and closing of the gate of a signal line leading toward the switch block 401. Thus, it is necessary to have dedicated hardware and software for performing optical line protection on the management and control card, and further, as the number of optical ports to be switched increases, the number of signal lines to be provided also increases, and the process for performing the switching also becomes more complicated, and as a result, the execution time for the switching itself is increased, which is a defect.

It is a main object of the present invention to provide an optical line protection device and a method, in which the configuration of the device is not complicated but simple and the switching of the optical lines can be performed at a high speed, even when a plurality of physical interface cards are packaged and a plurality of optical ports also exist on the card, and even when the switching commands of the optical line or the like are produced by turns because of the degradation such as a trouble or an error of the optical transmission line, or the manual operation from the superior management system, in the case of a configuration having a lot of optical ports because of the hugeness of the device.

Furthermore, it is an object to provide an optical line protection system, in which the configuration of the device is efficient and simple and the switching of the optical lines can be performed at a high speed, even in such a configuration where there is no frame signal for inserting K1–K2 control information and other overhead signals in order to increase the band of use, and continuous packet data is directly converted into light and is inputted or outputted as a line signal.

SUMMARY OF THE INVENTION

The optical line protection according to the present invention comprises protection means for performing optical line protection by using K1–K2 information inserted into a payload of a packet, for each physical interface.

Furthermore, the optical line protection system according to the present invention is the above described optical line protection system, in which the above described protection means includes: a filter for separating a payload of user data and a payload including K1–K2 information according to a control signal in a received payload; a selector for switching user data to be transmitted or K1–K2 information to be transmitted after adding a control signal of a value corresponding thereto; and control means for controlling an output buffer to a switch block and creating K1–K2 information to be transmitted and communicating with a physical interface card of another system on the basis of K1–K2 information in a payload including K1–K2 information outputted from the above described filter.

Furthermore, the optical line protection system according to the present invention is the above described optical line protection system further including means for detecting a trouble of the physical port by performing a CRC check on the basis of a payload length and a CRC code thereon.

The optical line protection in SDH/SONET according to the present invention includes protection means for performing optical line protection by using K1–K2 information inserted into an overhead of an SDH/SONET frame, for each physical interface.

Furthermore, the optical line protection in SDH/SONET according to the present invention is the above described optical line protection system in SDH/SONET, in which the above described protection means includes: extracting means for extracting the above described K1–K2 information from a received overhead; inserting means for inserting K1–K2 information to be transmitted into an overhead to be transmitted; and control means for controlling an output buffer to a switch block and creating K1–K2 information to be transmitted and communicating with a physical interface card of another system on the basis of K1–K2 information outputted from the extracting means.

Furthermore, the optical line protection in SDH/SONET according to the present invention is the above described optical line protection system in SDH/SONET further includes means for detecting a trouble of the physical port by performing a CRC check on the basis of a payload length and a CRC code thereon.

BRIEF DESCRIPTION OF THE DRAWINGS

This above-mentioned and other objects, features and advantages of this invention will become more apparent by reference to the following detailed description of the invention taken conjunction with the accompanying drawings, wherein:

FIG. 3 is a view showing a format of a signal outputted from the module 2014 to a filter 2017 and a signal outputted from a selector 2018 to the module 2014 according to embodiment 1 of the present invention;

FIG. 4 is a view showing a format of K1 information among K1–K2 control information;

FIG. 5 is a view showing a format of K2 information among K1–K2 control information;

DETAILED DESCRIPTION OF THE PREFERRED EMBODIMENTS

Figure 1:
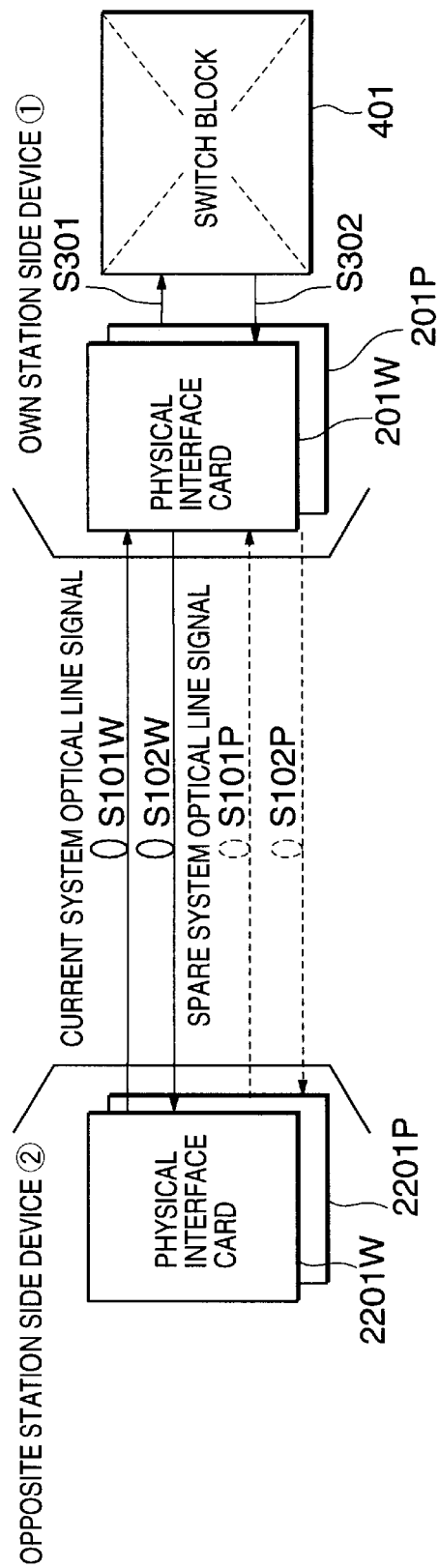
FIG. 1 is a block diagram showing the configuration of a line protection system according to an embodiment of the present invention.

FIG. 1 shows the configuration of the total of the system of the present invention. FIG. 1 shows an example where there is no frame and no overhead signal in SDH/SONET and the signal made by directly converting the data (refer to FIG. 2) of the continuous packets (packets described in claim 1) into light is inputted and outputted to and from the optical line signal port of each physical interface card.

Figure 12:
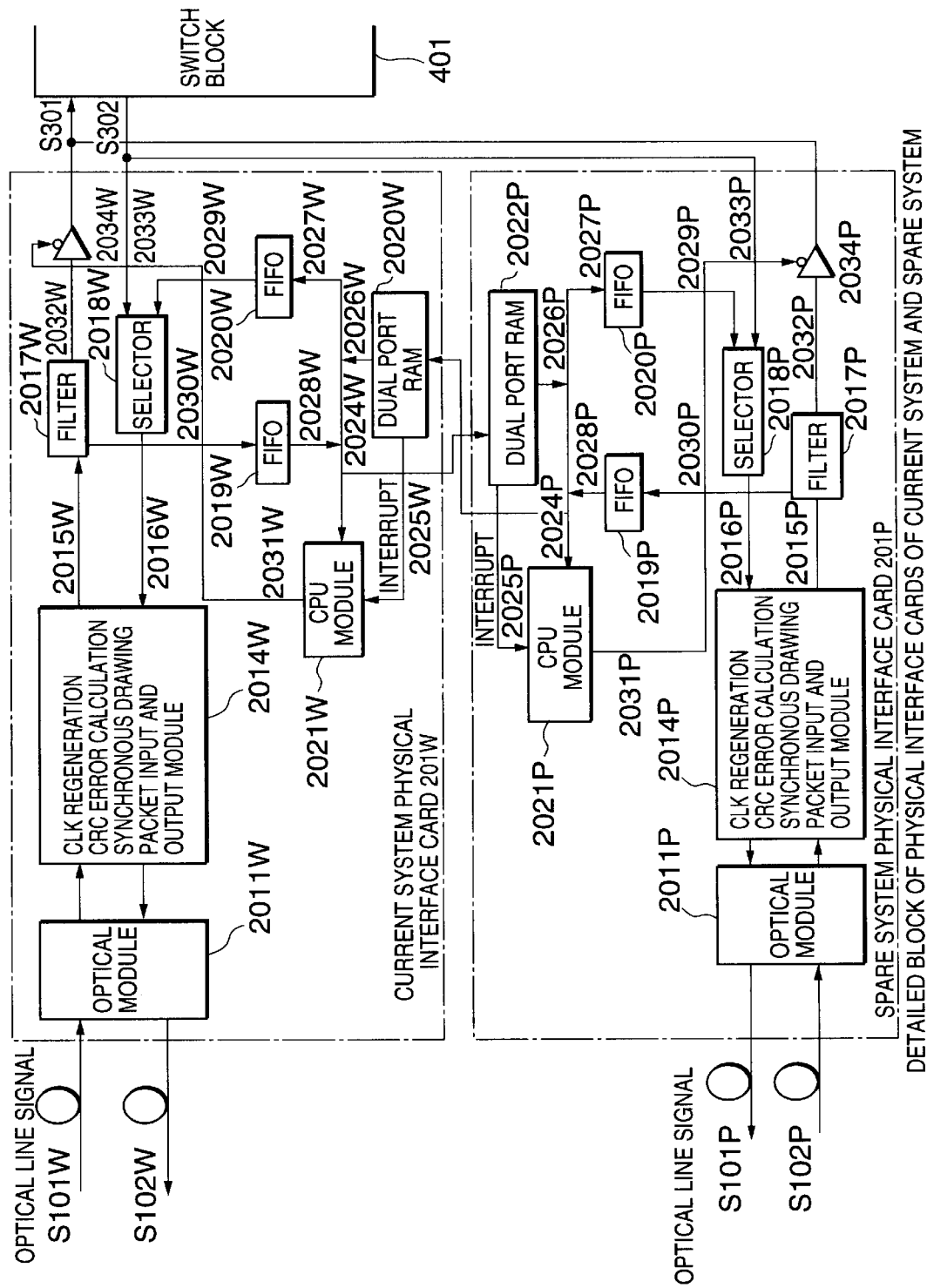
FIG. 12 is a block diagram showing the configurations of a current system physical interface card and a spare system physical interface card, and the connecting relation thereof according to embodiment 1 of the present invention.

As shown in FIG. 12, each of the physical interface cards (201W, 201P) of the current system and the spare system is connected to the physical interface card of the device on the opposite station side through the optical line respectively, and performs sending and receiving of the packet data with the device on the opposite station side.

Figure 2:
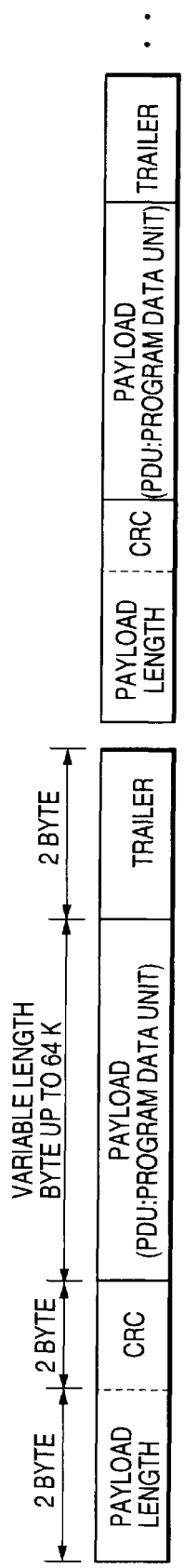
FIG. 2 is a view showing a format of a signal inputted and outputted between a module 2014 and an optical module 2011 according to an embodiment of the present invention.
Figure 11:
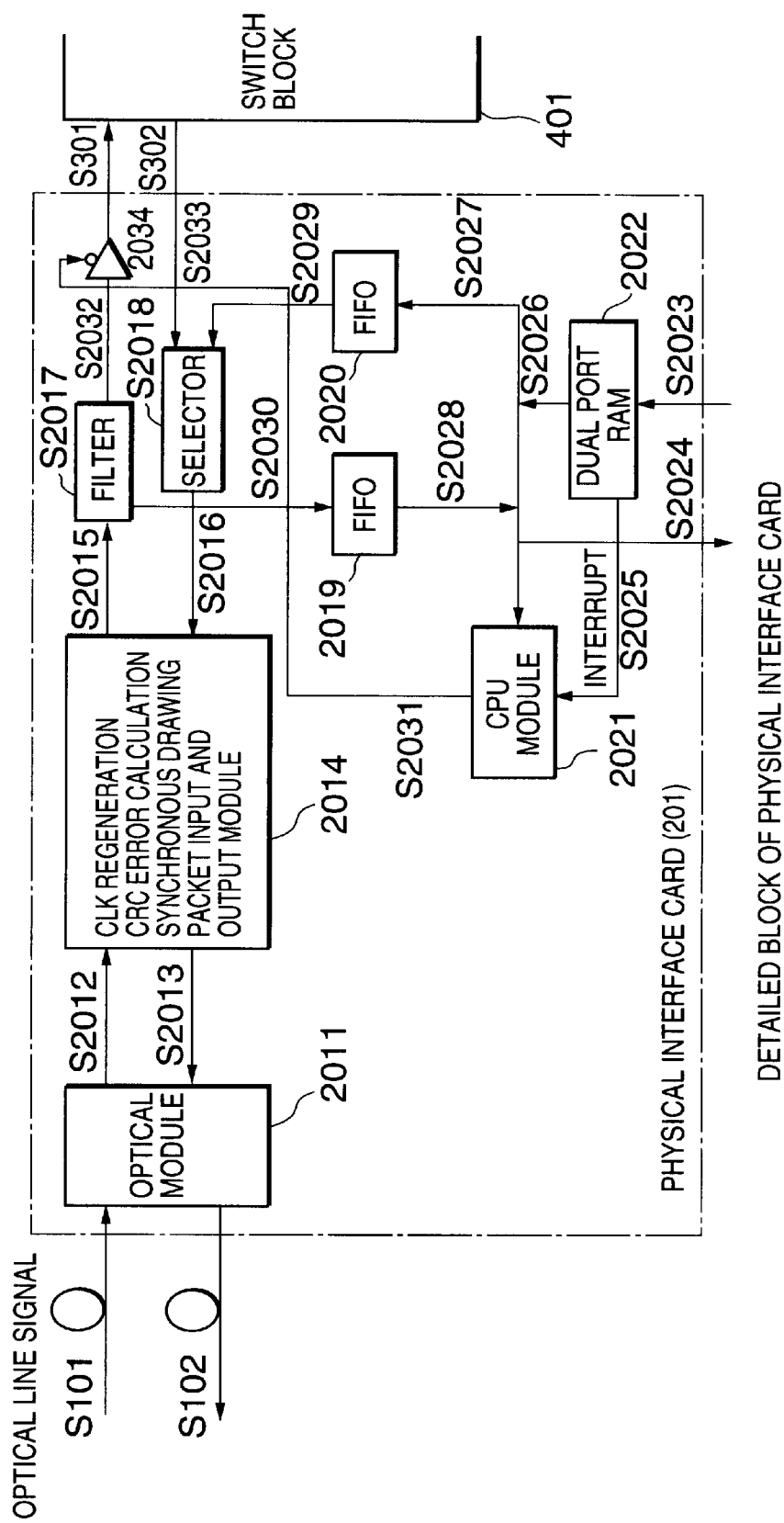
FIG. 11 is a block diagram showing the configuration of a physical interface card according to embodiment 1 of the present invention.

Referring to FIG. 11, an optical line reception signal (S101) is converted into an electric signal as continuous packet data (S2012) in an optical module 2011 of the physical interface card (201). From that continuous packet data signal S2012 (signal format is shown in FIG. 2), a clock is regenerated in a block 2014, and as for the packet data signal S2012, the CRC (Cyclic Redundancy Check) for every 2 Byte at the head showing the packet length is entirely performed for each byte on the stream, and by this, the head of the packet data signal S2012 can be found. In the head of the packet, information (2 Byte) showing the payload length is written, and on the basis of this payload length, the head of the next packet is found, and the CRC check is performed again. Thus, the heads of the packet are found by turns from a packet to a packet and the CRC check is performed, and as a result, a synchronous drawing state is made, and after that, the module (2014) outputs payload information (S2015) therein (FIG. 3).

On the contrary, in the optical line signal transmitting direction, the module (2014) adds information (2 Byte) showing the payload length, CRC information thereof, and a trailer (FIG. 2) to a packet data signal S302 as user data from a switch block (401) or packet data S2029 (format is shown in FIG. 3) as a switch request signal, and outputs them to the optical module 2011. The optical module 2011 converts the electric signal of the continuous packet data signal S2013 (format is shown in FIG. 2) into an optical signal.

The controlling packet data corresponding to K1–K2 control information (refer to FIGS. 4, 5) of the overhead of the SDH/SONET signal that is a switch request is processed in the physical interface card (201), and data other than that is inputted and outputted to and from the next block (switch block: 401) and processed. Here, the process of the physical panels (201W, 201P) of the switching signal (K1–K2 control information) for controlling the line protection will be described by using FIG. 11 and FIG. 12.

The controlling packet data corresponding to the K1–K2 control information that is a switch request is exchanged between the devices by the format frame in FIG. 2 similarly to other user data, and it is exchanged by the format in FIG. 3 to and from a CPU module (2021) and the switch block (401).

The controlling packet data and the packet as user data can easily be discriminated by writing some information in the Control field of the format in FIG. 3.

In the signal receiving direction, the Filter block (FIG. 11, 2017) finds a byte (Control) next to the head byte (Address) of a signal S2015 (PDU part in FIG. 2), and judges whether it is controlling packet data or a packet as user data by the value of the Control field therein, and in the case where it is controlling packet data, the signal S2015 is written in the FIFO (2019) as a signal S2030, and in the case where it is not controlling packet data, the signal S2015 is sent out to the switch block 401 through a tri-state buffer 2034 as user data S2032 as it is.

In the signal sending out direction, a user data signal S302 coming from the switch block 401 and a controlling packet data signal S2029 (PDU part in FIG. 2) coming from the CPU module 2021 are selected and multiplexed in a Selector 2018, and are sent out to the module 2014 as a signal S2016, and the module 2014 adds the information such as a payload length, a CRC, or a trailer to the signal S2016, and sends out the signal S2013 with a signal format in FIG. 2 to the optical module 2011.

By doing this, it is possible to attain an effect similar to the effect based on the switching of each line panel of the current system and the spare system where the extraction of K1–K2 control information from the overhead in the frame of SDH/SONET or the insertion of K1–K2 control information into the overhead is performed by the conventional method.

Next, the line switching from the current system to the spare system in a doubled optical transmission line will be described by referring to FIGS. 4 to 10 and FIG. 12.

FIGS. 6 to 10 show a state where a trouble (Signal Degrade with low priority) is produced in an optical line signal doubled to 1+1 (signal corresponding to 155 M or 622 M), and by using a two-way protection switching method (Bidirectional switching in both the sending and receiving directions of the optical line signal), the state transition is performed in each panel and the switching is performed from the current system to the spare system.

Every exchange of the basic protocol (exchange of switching K1–K2 control information) between the own station and the opposite station is performed through a line of the spare system, and it is similar to the previously standardized exchange of the K1–K2 control information using an SDH/SONET frame (reference: TR-NWT-000253 published by Bellcore).

Figure 6:
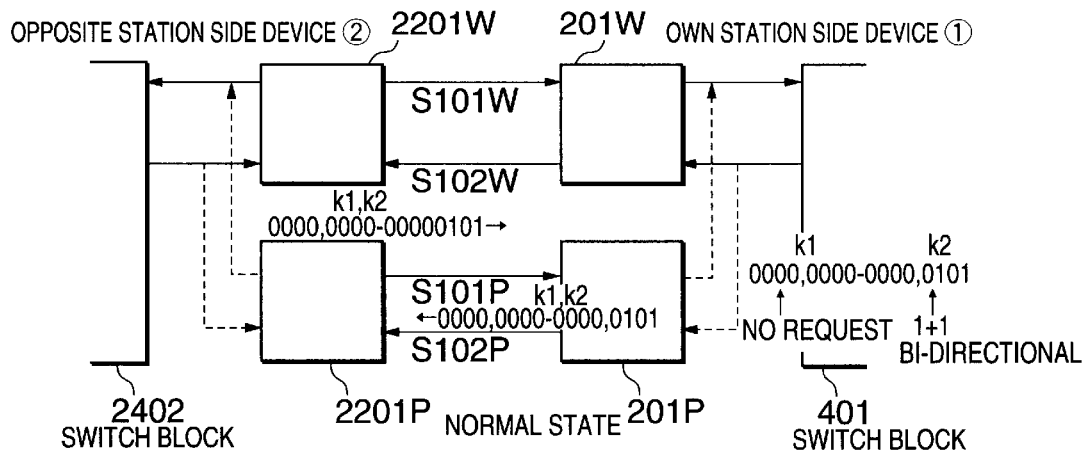
FIG. 6 is a first view for describing a protocol at the time of line switching according to an embodiment of the present invention.

Then, first, FIG. 6 shows a regular state where the K1–K2 control information is 0000, 0000-0000, 0101 (refer to FIGS. 4, 5 as for the detailed contents of the bit) and there is no trouble. Furthermore, the present information is exchanged so that the line switching is performed bidirectionally if performed, and in the case where a switch request is issued, the switching from the current system to the spare system is performed in both the transmission line and the reception line.

In FIG. 6, no switch request (SW REQ) that is a request for performing the switching is outputted from any station.

Figure 7:
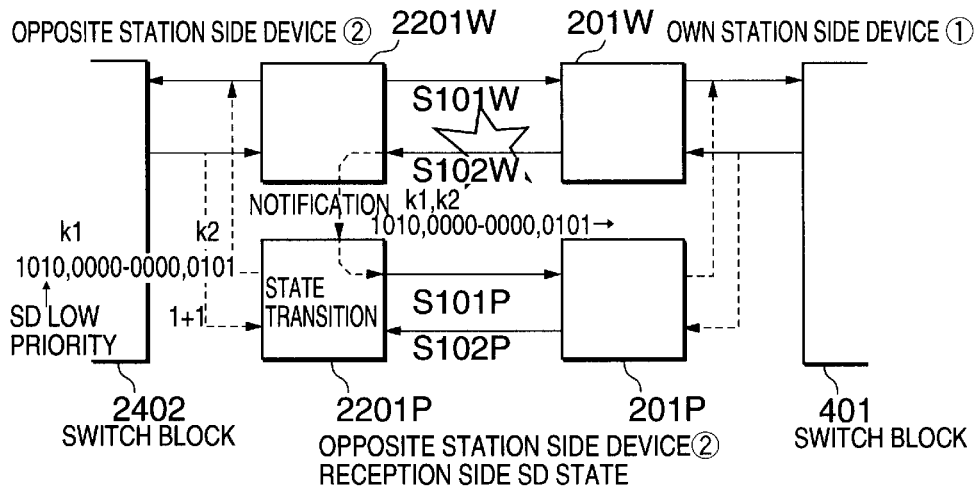
FIG. 7 is a second view for describing a protocol at the time of line switching according to an embodiment of the present invention.

Next, as shown in FIG. 7, a signal error (Signal Degrade) occurs in the current system optical line signal S102W, and the opposite station side device ② detects it. At that moment, the physical interface card 2201W of the opposite station side device ② detects the present error by performing a CRC check (refer to FIG. 2) of the head payload length (2 Byte) for each packet data. The signal error occurs because of an LOS (loss of signal), or an LOF (loss of frame) or the like, but these are not directly detected.

The current system physical interface card 2201W notifies the spare system line panel 2201P of the fact that a signal error (here, Signal Degrade with low priority) has occurred in the current system optical line signal S102W. As for the notifying method, in FIG. 12, the CPU module (2021W) on the current system physical interface card writes that effect into the Dual Port RAM (2022P) on the spare system physical interface card, and applies an interrupt onto the CPU module 2021P, and consequently, the notification can be performed.

Then, the spare system physical interface card 2201P transfers the K1–K2 control information (1010, 0000-0000, 0101) to the mating station through the spare system optical line signal S101P in order to notify the mating station (own station side device ①) of the fact that an error (Signal Degrade with low priority) has occurred in the current system optical line signal.

Figure 8:
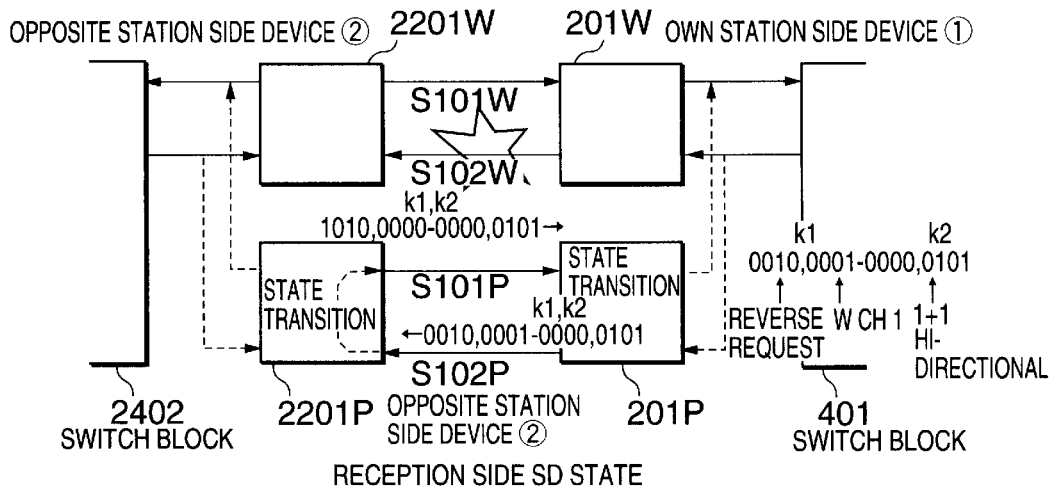
FIG. 8 is a third view for describing a protocol at the time of line switching according to an embodiment of the present invention.

In FIG. 8, the spare system physical interface card 201P of the own station side device ① receives the K1–K2 control information (1010, 0000-0000, 0101), and after that, it returns the K1–K2 control information (0010, 0001-0000, 0101 (reverse request of channel 1)) to the spare system physical interface card 2201P of the opposite station side device ② in order to notify the opposite station side device ② of the fact that the present signal has been received.

Figure 9:
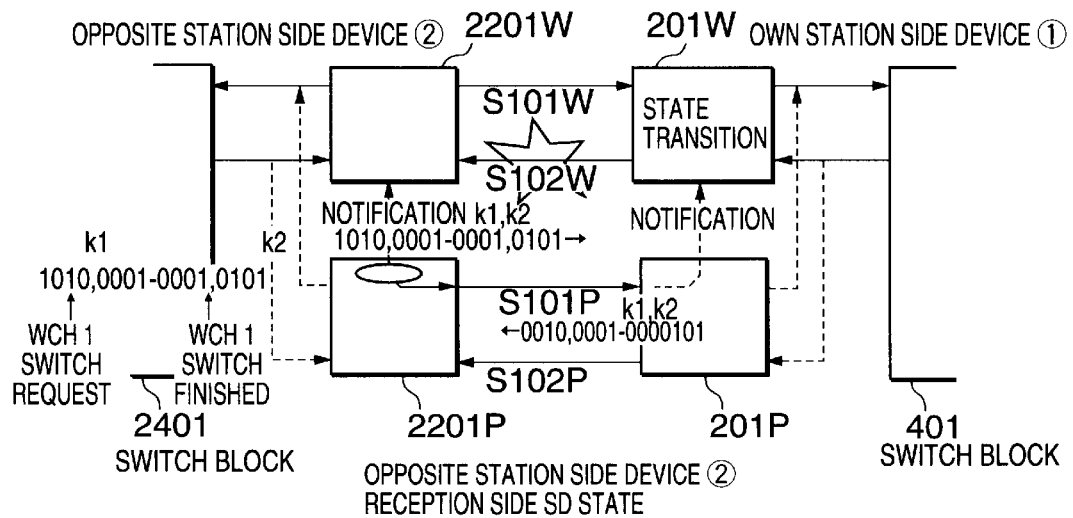
FIG. 9 is a fourth view for describing a protocol at the time of line switching according to an embodiment of the present invention.

In FIG. 9, the spare system physical interface card 2201P of the opposite station side device ② notifies the current system panel 2201W of the fact that the present signal has been received, and in the meantime, it returns the K1–K2 control information (1010, 0001-0001, 0101) to the spare system physical interface card 201P of the own station side device ①. Similarly, the spare system physical interface card of the own station side device ① returns the K1–K2 control information (0010, 0001-0000, 0101).

At that moment, the respective current system panels (201W, 2201W) receiving the notice close the tri-state buffers (2034W, similar buffer in the opposite station side device ②) of the signal lines S301, S2301 leading to the SW modules.

Figure 10:
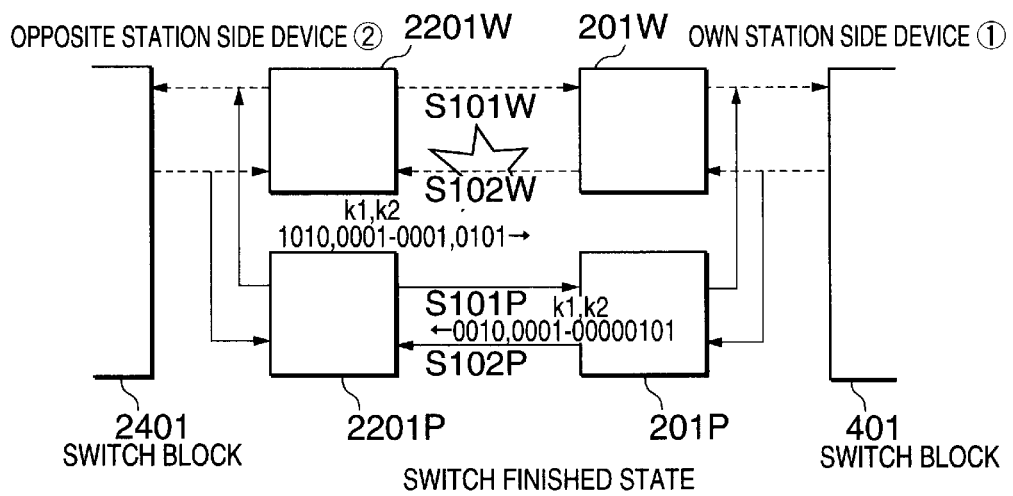
FIG. 10 is a fifth view for describing a protocol at the time of line switching according to an embodiment of the present invention.

In FIG. 10, in the respective stations, in order to finish the switching from the current system to the spare system of the line, the spare system panels (201P, 2201P) open the tri-state buffers (2034P, similar buffer in the opposite station side device ②) of the signal lines (S301, S2301) leading to the SW modules that have been closed until now, and output a signal, and consequently, the switching is finished.

FIGS. 11, 12 show the configurations of a first embodiment of the present invention, and the detailed action of each of those configurations will be shown below.

The present configuration shows the contents of a physical interface card (indicating 201W in FIG. 1) for inputting and outputting a signal made by directly converting continuous packet data (refer to FIG. 2) into light. In the part surrounded by a dotted line, the optical module 2011 converts the optical line reception signal (S101) into the continuous packet data (S2012) as an electric signal. The module (2014) regenerates the clock, and finds the head of the packet by entirely performing the CRC check for every 2 Byte for each byte on the stream, and finds the head of the next packet by the information (2 Byte) showing the payload length of the packet head, and performs the CRC check again, and consequently, a synchronous drawing state is made. Thus, the heads are found by turns from a packet to a packet, and the CRC check is performed, and when the synchronous drawing state is made, the payload information S2015 (FIG. 3) therein is outputted from the present block (2014).

The Filter block 2017 finds the byte (Control) next to the headbyte (Address) in the above signal S2015, and filters that to find whether it is controlling packet data (corresponding to the K1–K2 control information that is a switch request) or a packet as user data by the Control field in the payload, and in the case where it is a controlling packet, it is written in the FIFO (2019), and in the case where it is not a controlling packet, it is passed to the switch block 401 as the packet data S301 through the tri-state buffer 2034 as user data as it is. In the tri-state buffer 2034, the opening and closing is controlled on the basis of the control signal S2031 by the CPU.

The tri-state buffer 2034 is open normally when the physical interface card 201 is of the current system, and when the card is of the spare system, it is closed to have a high impedance output. Furthermore, the controlling packet data written in the FIFO (2019) is read out at any time by the CPU module (2021).

On the other hand, the Selector block 2018 selects and multiplexes the signal S2033 (the same as S302) coming from the switch block 401 and the controlling packet signal S2029 outputted from the CPU module (2021) and coming through the FIFO (2020), and sends out them to the block (2014) as the signal S2016 (refer to FIG. 3 as for the packet format). At this moment, the value of the control of the second byte of the signal S2015 is switched depending on whether the signal S2033 is selected or the signal S2029 is selected.

As mentioned above, the block (2014) adds the information such as a payload length, a CRC, or a trailer so that the signal has the signal format in FIG. 2, and sends out the signal to the optical module 2011.

The Dual Port RAM (2022) is an PAM for communicating with the spare system panel, and the data as the S2023 coming from the CPU module on the spare system physical interface card is written in the Dual Port RAM (2022), and the fact that writing-in has been performed to the CPU module is shown by the interrupt signal S2025, and that data is read out as the S2026. On the contrary, in order to tell the information to the mating panel, the CPU module (2021) writes the data as the S2024 in the Dual Port RAM on the spare system physical interface card, and similarly, an interrupt signal is produced to tell the fact that writing-in is performed to the CPU on the spare system physical interface. Thus, the exchange of data is performed between the physical interface cards of the current system and the spare system (details are shown in FIG. 12).

Figure 13:
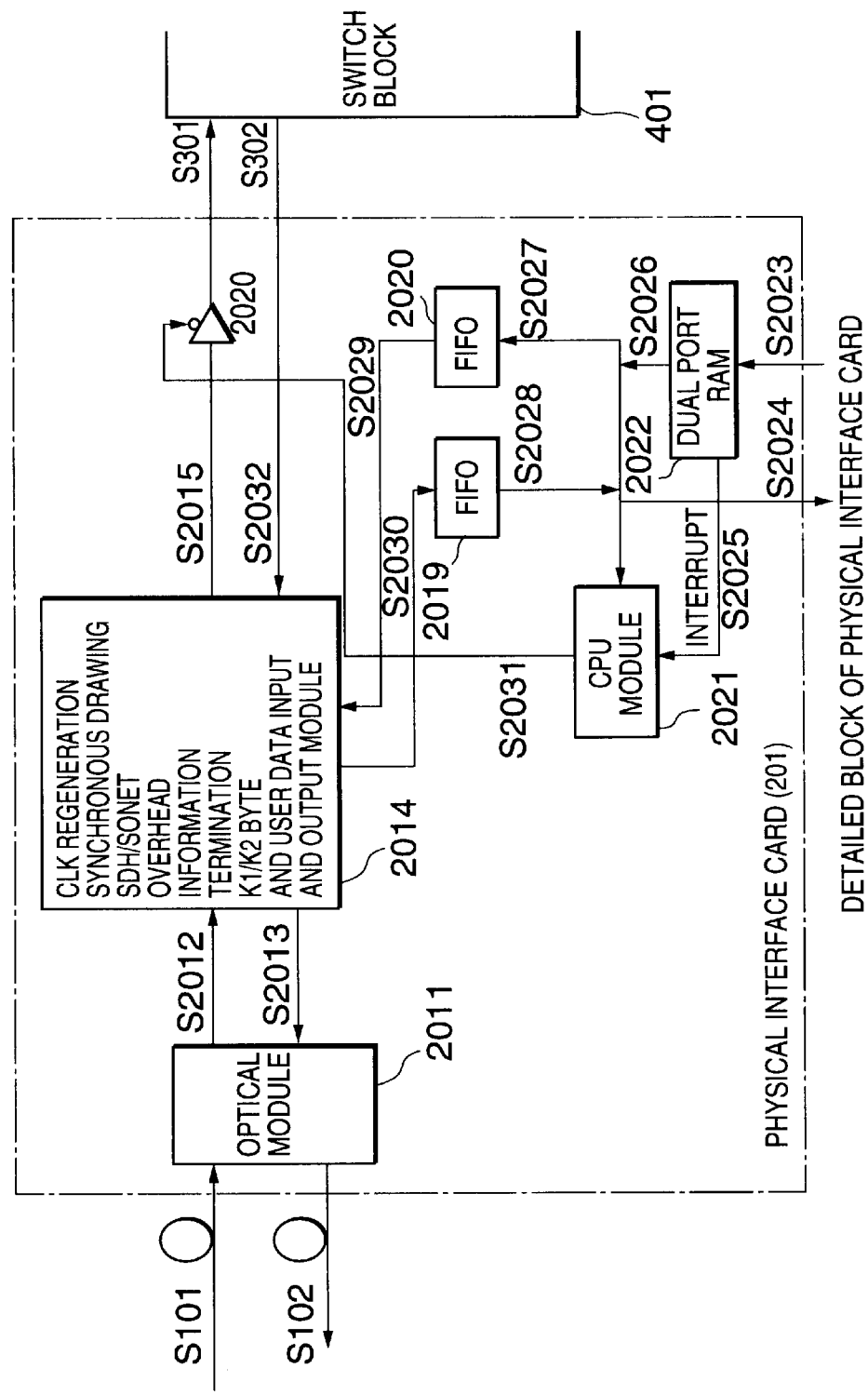
FIG. 13 is a block diagram showing the configuration of a physical interface card according to embodiment 2 of the present invention.

FIG. 13 shows a second embodiment of the present invention.

Figure 14:
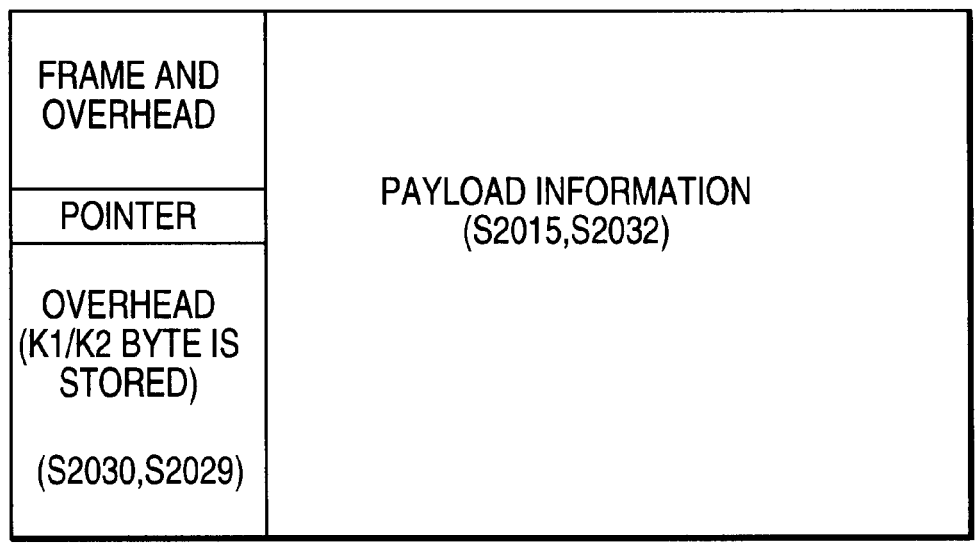
FIG. 14 is a figure showing a frame format of SDH/SONET used in embodiment 2 of the present invention.
Figure 15:
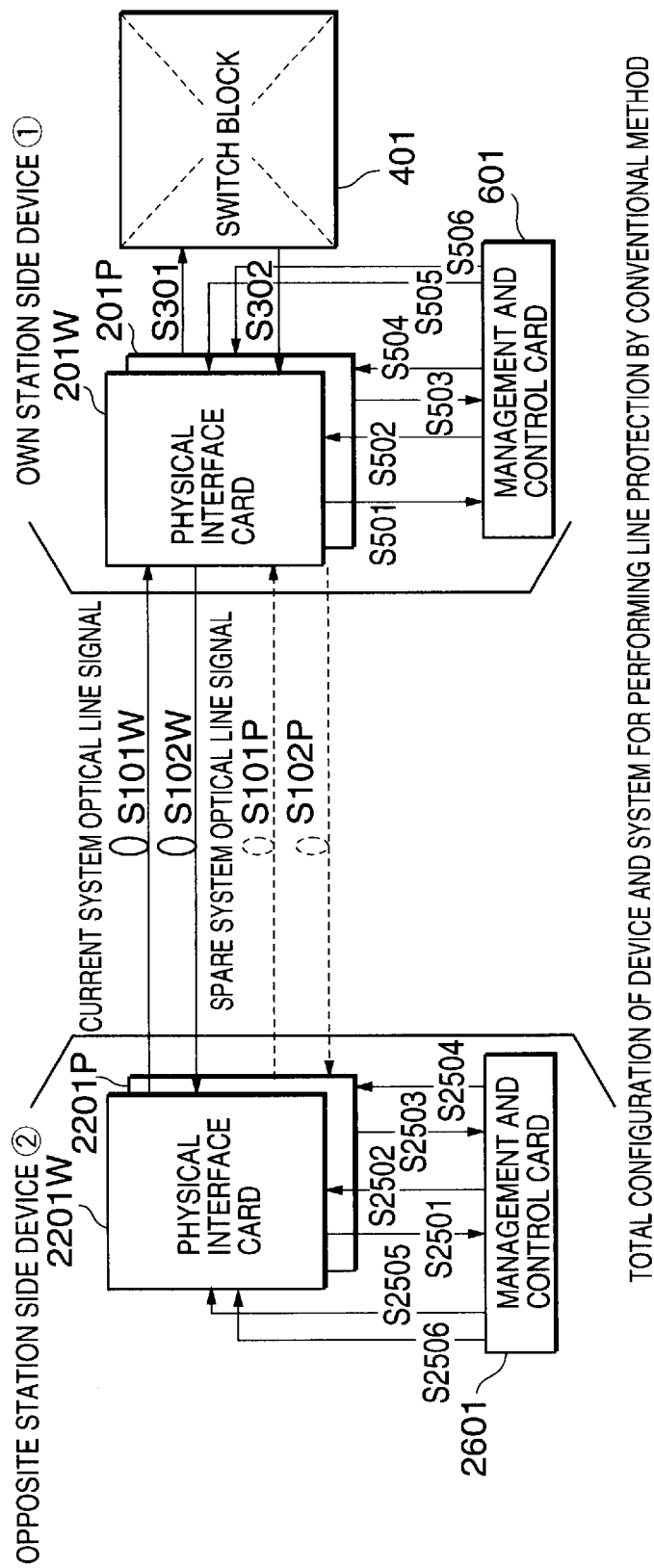
FIG. 15 is a block diagram showing the configuration of a line protection system according to a conventional example.

As described until now, in the first embodiment, the line protection is performed by such a system where packets shown in FIGS. 2, 3 are continued and they are directly inputted into the device with a circuit configuration shown in FIG. 11 as an optical line signal, and on the other hand, in the second embodiment, a similar effect can be obtained even in the case where the optical input and output signal has a conventional frame configuration (refer to FIG. 14) of SDH/SONET.

The basic action of the total of the device such as the exchange of the K1–K2 control information (protocol) for performing the optical line switching between the devices of the own station and the opposite station, or the exchange of the information using the Dual Port RAM between the current system physical interface card and the spare system physical interface card is the same as that of the first embodiment.

Here, the processing of the K1–K2 control information to be the trigger for the optical line switching in the physical interface card will be described. In the optical module 2011 on the physical interface card, the optical line reception signal (S101) with the frame format (refer to FIG. 14) of SDH/SONET is converted into an electric signal. The electric signal S2012 is inputted into the module 2014 to regenerate a clock, and the synchronous drawing and the termination of the overhead information are performed by the frame signal, and the information of the K1–K2 control information is separated and is written in the FIFO (2019) as S2030. On the other hand, the user data as a payload signal in which the overhead signal such as the frame signal is removed is outputted to the switch block (401) as S2015. On the contrary, in the optical signal transmitting direction, the payload signal S302 as user data from the switch block (401) is written in the module 2014 as S2032, and there, the frame information and pointer value of SDH/SONET, other overhead signals, and K1–K2 control information are inserted, and the signal is outputted to the optical module 2011 as a signal with a frame of SDH/SONET shown in FIG. 14, and finally, it is outputted from the present physical interface card as the optical line signal S102.

Here, the K1–K2 control information is outputted as S2027 by the CPU module 2021, and is written in the FIFO (2020) in advance, and it can be transferred to the opposite station as the information (FIG. 14) in the above frame of SDH/SONET by being read out of the present FIFO (2020) as the signal S2029 by the timing of outputting the K1–K2 control information as the overhead. The reading-out of the K1–K2 control information from the FIFO (2019) by the CPU module 2021, the writing-in to the FIFO (2020), the communication with the spare system physical interface card using the Dual Port RAM (2022), and the state transition because of the exchange of the K1–K2 control information between the devices of the own station and the opposite station or the like are similar to those of the first embodiment, and therefore, here, there is no special need to give a description, but a similar effect can be obtained, that is, the line switching can be performed at a high speed and with a simple configuration of the device.

As described above, the present invention is a device for performing line protection in the switching based on a trouble (because of a signal LOS (loss of signal), an LOF (loss of frame), an error or the like) of the physical port (SDH/SONET line) that is a physical layer, or a switching command from the mating station side in a system shown in FIG. 1, wherein there is such an effect that the line switching can be performed at a high speed and with a simple configuration of the device by performing the exchange of the K1–K2 control information as a switching signal only between physical interface cards of the current system and the spare system, even in the case (refer to FIGS. 2, 3) where there is no SDH/SONET frame and packet data is directly exchanged as an optical signal, though the line switching has previously been performed in such a way, where the K1–K2 control information that is a switching signals is extracted from the overhead signal of the SDH/SONET frame in each of the physical interface cards of the current system and the spare system, and those signals are outputted to the management and control card for intensively managing the devices, and the processing is performed in that management and control card.

What is claimed is:

1. An optical line protection device, comprising protection units for performing optical line protection by using K1–K2 information inserted into a payload of a packet, for processing in each physical interface, wherein said protection units comprise:

a filter for separating a payload of user data from a payload including K1–K2 information according to a control signal in a received payload;

a selector for switching user data to be transmitted or K1–K2 information to be transmitted after adding a control signal of a value corresponding thereto; and control units for controlling an output buffer to a switch block and creating K1–K2 information to be transmitted and communicating with a physical interface card of another system on the basis of K1–K2 information in a payload including K1–K2 information outputted from said filter.

2. The optical line protection device according to claim 1, further comprising means for detecting a trouble of a physical port by performing a CRC check on the basis of a payload length and a CRC code thereon.

3. The optical line protection device according to claim 1, further comprising units for detecting a trouble of a physical port by performing a CRC check on the basis of a payload length and a CRC code thereon.

4. An optical line protection network made by connecting an optical line protection device according to claim 1.

5. An optical line protection device in SDH/SONET (synchronous digital hierarchy/synchronous optical network), comprising protection units for performing optical line protection by using K1–K2 information inserted into an overhead of an SDH/SONET frame, for processing in each physical interface, wherein said protection units comprise:

extracting units for extracting said K1–K2 information from a received overhead;

inserting units for inserting K1–K2 information to be transmitted into an overhead to be transmitted; and control units for controlling an output buffer to a switch block and creating K1–K2 information to be transmitted and communicating with a physical interface card of another system on the basis of K1–K2 information outputted from the extracting units.

6. An optical line protection method, comprising: inserting K1–K2 information into a payload of a packet; and performing an optical line protection step by using said K1–K2 information inserted into a payload of a K1–K2 information packet, wherein said protection step comprises:

separating a payload of user data and a payload including K1–K2 information according to a control signal in a received payload;

switching user data to be transmitted or K1–K2 information to be transmitted after adding a control signal of a value corresponding thereto;

controlling an output buffer to a switch block on the basis of K1–K2 information in a payload including K1–K2 information outputted from said filter; and creating K1–K2 information to be transmitted and communicating with a physical interface card of another system.

7. The optical line protection method according to claim 6, further comprising detecting a trouble of a physical port by performing a CRC check on the basis of a payload length and a CRC code thereon.

8. In optical line protection in SDH/SONET (synchronous digital hierarchy/synchronous optical network), an optical line protection method in SDH/SONNET, comprising a protection step of performing optical line protection by using K1–K2 information inserted into an overhead of an SDH/SONET frame, wherein said protection step comprises:

extracting said K1–K2 information from a received overhead;

inserting K1–K2 information to be transmitted into an overhead to be transmitted; and a control step, wherein said control step comprises:
controlling an output buffer to a switch block,
creating K1–K2 information to be transmitted, and
communicating with a physical interface card of another system on the basis of K1–K2 information outputted from the extracting means.

9. The optical line protection method in SDH/SONET according to claim 8, further comprising detecting a trouble of a physical port by performing a CRC check on the basis of payload length and a CRC code thereon.

* * * * *